United States Patent
Ootsuka et al.

(10) Patent No.: US 8,808,470 B2
(45) Date of Patent: Aug. 19, 2014

(54) HIGH-CARBON CHROMIUM BEARING STEEL AND PRODUCTION METHOD OF THE SAME

(75) Inventors: Syunichi Ootsuka, Tokyo (JP); Yoshitaka Nishiyama, Tokyo (JP); Tadashi Kawakami, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/993,129

(22) PCT Filed: Dec. 13, 2011

(86) PCT No.: PCT/JP2011/006940
§ 371 (c)(1),
(2), (4) Date: Jun. 11, 2013

(87) PCT Pub. No.: WO2012/081229
PCT Pub. Date: Jun. 21, 2012

(65) Prior Publication Data
US 2013/0263972 A1    Oct. 10, 2013

(30) Foreign Application Priority Data
Dec. 13, 2010 (JP) ................................. 2010-276797

(51) Int. Cl.
*C21D 9/40* (2006.01)
*C22C 38/22* (2006.01)
*C22C 38/24* (2006.01)

(52) U.S. Cl.
USPC .......................................... 148/225; 148/319

(58) Field of Classification Search
USPC .......................................... 148/206, 225, 319
See application file for complete search history.

(56) References Cited

U.S. PATENT DOCUMENTS 6,383,317 B1 * 5/2002 Bellus et al. .................. 148/659

FOREIGN PATENT DOCUMENTS

| JP | 2-54717 | 2/1990 |
|---|---|---|
| JP | 3-2327 | 1/1991 |
| JP | 3-126858 | 5/1991 |
| JP | 3-281723 | 12/1991 |
| JP | 4-136117 | 5/1992 |
| JP | 5-78734 | 3/1993 |
| JP | 5-148611 | 6/1993 |
| JP | 07-30438 | 4/1995 |
| JP | 2000-319723 | 11/2000 |
| JP | 2003-27144 | 1/2003 |
| WO | 99/34023 | 7/1999 |

* cited by examiner

*Primary Examiner* — Jessee Roe
(74) *Attorney, Agent, or Firm* — Clark & Brody

(57) ABSTRACT

Provided is a production method including: heating a workpiece at a temperature higher than an $A_{c1}$ transformation point in a carburizing atmosphere; slowly cooling the workpiece at not more than 70° C./Hr down to a temperature T satisfying Formula (1) while maintaining the carburizing atmosphere: $A_{r1}-20 \geq T(°C.) \geq 300°C. \ldots (1)$; and cooling the workpiece in an oxidizing atmosphere. According to this method, it is possible to efficiently produce a high-carbon chromium bearing steel whose depth of the recarburized layer or the overcarburized layer is within a range from 0 to 0.2 mm, having less machining allowance, and excellent in machinability, using a steel tube after hot tube-making.

1 Claim, 1 Drawing Sheet

HIGH-CARBON CHROMIUM BEARING STEEL AND PRODUCTION METHOD OF THE SAME

TECHNICAL FIELD

The present invention relates to a high-carbon chromium bearing steel excellent in machinability for use as a starting material of a bearing, and to a production method of the same.

Terms used in the present description are defined as follows unless specifically stated otherwise.

"Carburizing" denotes impregnating a surface of steel with carbon through specific processing such as gas-carburizing.

"Decarburizing" denotes having a reduced carbon concentration of a near-surface portion of steel, compared to a carbon concentration of base metal through heat treatment or the like.

"Recarburizing" denotes restoring a state before decarburizing by impregnating with carbon a portion where the carbon concentration is reduced due to decarburization.

"Overcarburizing" denotes causing excessive carburization due to excessive recarburization, so that the carbon concentration of the surface of steel becomes more than that of base metal.

"%" denotes mass percentage of each element included in a target material (a high-carbon chromium bearing steel).

BACKGROUND ART

Bearing rings used in bearings are locally and repetitively subjected to high surface pressure, and are required to have wear resistance. A high-carbon chromium bearing steel specified by JIS G 4805 is used in bearing rings of such bearings. This steel is made by increasing a carbon content of base metal, and applying heat treatment for spheroidizing (spheroidizing annealing) carbide, so as to attain a hard surface, preferable sliding characteristics and machinability.

In such a high-carbon chromium bearing steel, the base metal has a high C content, and its surface becomes decarburized when heated at a high temperature unless a furnace atmosphere is controlled. Such a steel for use in bearing steel is usually heated at a high temperature in a decarburizing atmosphere during processes of casting, blooming and billet-making, and hot tube-making; and consequently, a decarburized layer still remains on the surface of steel after a rolling process (cold rolling, cold drawing).

A high-carbon chromium bearing steel is subjected to processing such as cutting-off, machining, and quenching, and used for producing parts such as bearing rings, and if a decarburized layer remains after machining, a predetermined strength and microstructure cannot be attained in a portion with the decarburized layer, which causes deterioration of sliding characteristics. Consequently, if there is a deep decarburized layer, this decarburized layer is removed by use of grinding or the like before machining, which causes increase in man-hour, and deterioration of a yield, resulting in significant increase in a manufacturing cost.

As a solution for the problem, disclosed are heat treatment methods for recarburizing the decarburized layer through an atmosphere control. For example, Patent Literature 1 describes carburizing in an austenite region at a high temperature. A spheroidizing annealing method is disclosed in which bearing steel or hypereutectoid steel is used as a target, wherein, the target material is heated to be carburized in an austenite ($\gamma$) region of not less than an $A_{cm}$ transformation point at an initial stage of a heat pattern of spheroidizing annealing, thereby preventing decarburization, which has been generated in conventional spheroidizing annealing.

Meanwhile, Patent Literature 2 and Patent Literature 3 describe carburizing in a ferrite region. Patent Literature 2 proves that diffusion velocity of carbon is further rapid in $\alpha$ phase at a lower temperature than in $\gamma$ phase at a higher temperature, and recarburizing can be sufficiently attained even in $\alpha$ phase, and also Patent Literature 2 discloses a carburizing and heat treatment method of high-carbon chromium bearing steel, wherein during spheroidizing annealing, recarburizing and spheroidizing of a decarburized layer are carried out at the same time in a carburizing atmosphere in a temperature range of 720 to 700° C. that is not more than $A_1$ transformation point.

Patent Literature 3 discloses such a heat treatment method that controls a temperature in discharging a workpiece, an atmosphere gas flow rate at a discharging zone and an furnace pressure, a cooling rate, and a $(CO)^2/CO_2$ value of an atmosphere in a temperature range of not more than $A_1$ transformation point to not less than 500° C., thereby preventing generation of soot, and reducing a decarburized layer owing to recarburization.

Patent Literature 4 describes a decarburization level control through gas carburizing and carbon diffusion. Specifically, Patent Literature 4 discloses such a decarburization suppressing method of high-carbon chromium bearing steel, wherein recarburizing and overcarburizing are carried out at the same time as spheroidizing in an atmosphere-controlled annealing furnace, and continuously spheroidizing is carried out in a direct fired heating furnace while sufficiently encouraging scale-off and carbon diffusion in an overcarburized portion of steel, thereby controlling the decarburization level.

Patent Literature 5 describes recarburizing after descaling. Specifically, Patent Literature 5 discloses such a recarburizing method of a steel ring cut from a high-carbon chromium bearing steel tube, wherein oxygen is removed through descaling prior to heat treatment in a carburizing atmosphere so as to facilitate recarburizing, and thereafter, annealing is applied in the carburizing atmosphere for recarburizing or overcarburizing the steel ring.

Patent Literature 6 and Patent Literature 7 describe decarburizing prevention by removing oxygen in scale or removing the scale. Patent Literature 6 discloses such a heat treatment method of steel, wherein $(CO)^2/CO_2$ of the atmosphere is controlled so as to remove oxygen in the scale prior to final heating, and an atmosphere control is carried out without recarburizing or decarburizing in the final heat treatment. Patent Literature 7 discloses such a decarburizing prevention method of an inner surface of a steel tube, wherein spheroidizing annealing of the steel tube is carried out using a direct fired heat treatment furnace by applying annealing to the steel tube with its both tube ends sealed after the scale is removed. It is considered that an inner surface of the workpiece has no reaction with a furnace atmosphere gas because carbon diffusion is encouraged inside the workpiece.

Patent Literature 8 describes decarburizing prevention of an inner surface of a steel tube by coating graphite to this inner surface. Specifically, Patent Literature 8 discloses a decarburizing preventing method of the inner surface of the steel tube, in which in heat treatment of the steel tube in a decarburizing atmosphere furnace, a mixture of graphite and non-flammable liquid even at a high temperature is applied on the inner surface of the steel tube, so as to increase carbon potential on the inner surface of the steel tube, thereby carrying out recarburizing of the steel tube.

CITATION LIST

Patent Literature

Patent Literature 1: Japanese Patent Application Publication No. 02-54717
Patent Literature 2: Japanese Patent Application Publication No. 03-126858
Patent Literature 3: Japanese Patent Application Publication No. 05-148611
Patent Literature 4: Japanese Patent Application Publication No. 04-136117
Patent Literature 5: Japanese Patent Application Publication No. 2003-27144
Patent Literature 6: Japanese Patent Application Publication No. 2000-319723
Patent Literature 7: Japanese Patent Application Publication No. 05-78734
Patent Literature 8: Japanese Patent Application Publication No. 03-2327

SUMMARY OF INVENTION

Technical Problem

Unfortunately, the method described in above Patent Literature 1 has a problem that heating of the steel in a γ region for a long time causes austenite grain coarsening, and hinders uniform diffusion of spheroidal carbides.

The method described in Patent Literature 2 uses gaseous mixture of $CO$, $H_2$, $CO_2$, and $N_2$, as a carburizing gas; it is however difficult and costly to control their gas composition. In the case of also using a carburizing atmosphere in a temperature range higher than the $A_1$ transformation point, and cooling the steel in an $N_2$ atmosphere, an overcarburized layer having higher hardness becomes deeper, which deteriorates machining efficiency in a machining process during producing the bearings. In the method of controlling the $(CO)^2/CO_2$ of the atmosphere described in Patent Literature 3, a higher carbon concentration of not less than 0.6% increases the carbon potential of steel, which makes it difficult to recarburize the steel, so that sufficient recarburization cannot be attained in a deeper decarburized layer.

Although the method of Patent Literature 4 applies recarburizing in the atmosphere-controlled annealing furnace, recarburizing in the atmosphere-controlled annealing furnace becomes insufficient if the decarburized layer of the blank tube has carbon concentration of not more than 0.5% where decarburization becomes intensive, and consequently decarburizing cannot be suppressed even with diffusion of carbon in the direct fired heating furnace.

In the method of Patent Literature 5 that carries out descaling in advance so as to facilitate recarburizing, if the blank tube has a thinner decarburized layer, the overcarburized layer likely becomes thicker, which deteriorates machining efficiency during machining. In the method of Patent Literature 6 that removes oxygen in the scale by controlling $(CO)^2/CO_2$ in the atmosphere, there is a problem that oxygen in the scale cannot be removed if the scale of the blank tube is thicker, and if the blank tube has a thicker decarburized layer, the decarburized layer still remains after the final heat treatment even if oxygen in the scale is removed.

The method of Patent Literature 7 has a problem that causes increase in man-hour required for plug-sealing operation. If the decarburized layer is thicker, annealing for a longer time is required for recarburizing through carbon diffusion, which deteriorates efficiency of the heat treatment process. The method of Patent Literature 8 also has a problem that requires heavier man-hour and cost for coating the mixture of graphite and non-flammable liquid even at a high temperature on the inner surface of the tube, and it is difficult to coat this mixture to a steel tube with a smaller diameter.

In the above prior art, there are such problems that not only the decarburized layer remains due to insufficient recarburizing, but also excessive recarburization generates an overcarburized layer having higher hardness, which reduces durability life of machining tools during machining such as cutting-off, machining, and quenching of high-carbon chromium bearing steels. There is another problem that the increase in man-hour and cost can be inevitable.

The present invention has been accomplished in light of the above problems in the prior art, and based on various studies on these problems, an object of the present invention is to provide a method for efficiently producing a high-carbon chromium bearing steel excellent in machinability for use as a starting material of a bearing, which prevents the decarburized layer from remaining in plenty due to insufficient recarburizing, and avoids the presence of a thick overcarburized layer due to excessive recarburizing.

Solution to Problem

The present inventors have conducted various studies to solve the aforementioned problems, and as a result of these, the present inventors have confirmed that it is possible to solve the above problems by applying the following solution to a steel tube after hot tube-making.

Specifically, during producing high-carbon chromium bearing steel, a steel tube after hot tube-making is heated at a temperature higher than an $A_{c1}$ transformation point ($A_1$ transformation point when heating the steel tube from a lower temperature) in an carburizing atmosphere. Thereafter, the steel tube is slowly cooled down to a preferable temperature of not more than ($A_{r1}$ transformation point–20)° C. while maintaining the carburizing atmosphere so as to encourage carburizing in a decarburized layer and to recarburize. At this time, excessive carburizing may cause overcarburizing. Subsequently, the steel tube is cooled in an oxidizing atmosphere so as to control the thickness of the decarburized layer or an overcarburized layer to be within a preferable range. As described above, the preferable temperature of not more than ($A_{r1}$ transformation point–20)° C. is determined depending on the degree of decarburization generated during processes from casting to hot tube-making.

According to this method, adjusting a temperature for starting cooling in the oxidizing atmosphere depending on the degree of decarburization of a workpiece (steel tube after hot tube-making) enables recarburizing to be promoted or enables overcarburizing to be suppressed as well as controlling a depth of the decarburized layer or of the overcarburized layer to be within a preferable range. Accordingly, it is possible to efficiently produce a high-carbon chromium bearing steel excellent in machinability, having less machining allowance so as to facilitate machining, which can solve the problems of the suggested conventional methods such as: the overcarburized layer becomes deeper (the methods of above Patent Literatures 2 and 5); the decarburized layer remains because of insufficient recarburizing (the methods of Patent Literatures 3, 4 and 6); the heat treatment process becomes inefficient (the method of Patent Literature 7), heavier man-hour and cost are required (the method of Patent Literature 8), wherein spheroidizing and recarburizing are carried out at the same time so as to control the depth of the decarburized layer to be within a range of 0 to 0.2 mm, or the depth of the overcarburized layer to be within a range of 0 to 0.2 mm (that is, a range commonly defined as an allowable depth of a decarburized layer in a steel tube).

The high-carbon chromium bearing steel described in the present invention denotes any type of high-carbon chromium bearing steel specified by SUJ1 to 5 in JIS G 4805 whose C content is high, and also denotes such a steel that further contains one or more of Mo, W, and V if necessary.

The summaries of the present invention are described in the production method of a high-carbon chromium bearing steel of (1) below, and in the high-carbon chromium bearing steel of (2) and (3) below.

(1) A production method of a high-carbon chromium bearing steel including: heating a workpiece at a temperature of higher than an $A_{c1}$ transformation point in a carburizing atmosphere; slowly cooling the workpiece at not more than 70° C./Hr down to a temperature T satisfying Formula (1) while maintaining the carburizing atmosphere: $A_{r1} - 20 \geq T(°C.) \geq 300°C$. ... (1); and cooling the workpiece in an oxidizing atmosphere, where "$A_{c1}$" denotes an $A_1$ transformation point at which a two-phase region of ferrite ($\alpha$) and cementite ($\theta$) shifts to a two-phase region of austenite ($\gamma$) and cementite ($\theta$) at the time of heating the workpiece from a lower temperature. "$A_{r1}$" denotes the $A_1$ transformation point at which the two-phase region of austenite and cementite shifts to the two-phase region of ferrite and cementite at the time of cooling the workpiece from a higher temperature.

The "workpiece" denotes a blank tube obtained in the production process of a high-carbon chromium bearing steel by using various hot tube-making processes (such as the extrusion tube-making process, the push-bench tube-making process, and the Mannesmann tube-making process, etc.) after steel is melted and casted.

(2) A high-carbon chromium bearing steel produced by the method set forth in the above (1), comprising, in mass %: C: 0.6 to 1.5%; Cr: 0.5 to 5.0%; Si: not more than 1.0%; and Mn: not more than 2.0%, the balance being Fe and impurities.

(3) The high-carbon chromium bearing steel set forth in the above (2), further comprising, in mass %, one or more of Mo: not more than 1.0%; W: not more than 1.0%; and V: not more than 1.0%, in place of part of Fe.

Advantageous Effects of Invention

The production method of the high-carbon chromium bearing steel of the present invention promotes recarburizing or overcarburizing in a carburizing atmosphere, and thereafter shifts the atmosphere to the oxidizing atmosphere during the process of applying spheroidizing annealing to the blank tube after hot tube-making, thereby controlling the depth of the decarburized layer or of the overcarburized layer. According to this method, it is possible to efficiently produce a high-carbon chromium bearing steel excellent in machinability, having less machining allowance, and suppressing deterioration of machining efficiency.

DESCRIPTION OF EMBODIMENTS

Figure 1:
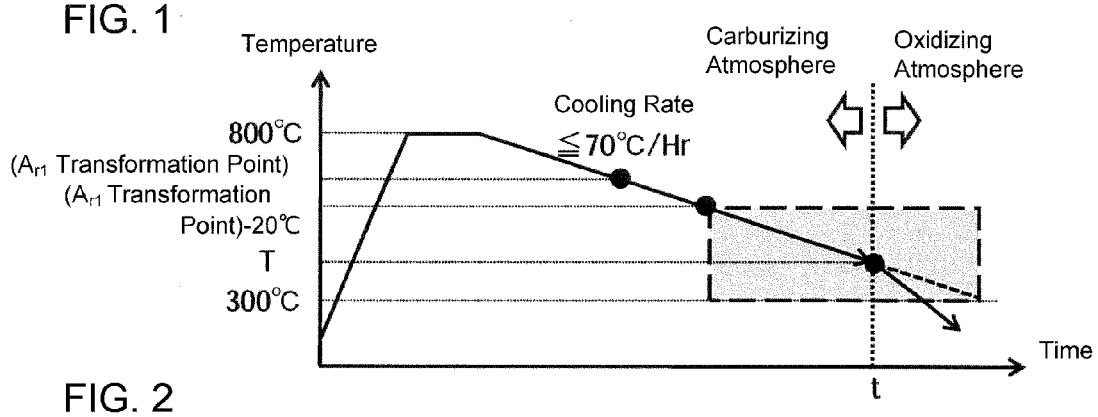
FIG. 1 is a drawing showing an example of a heat pattern of spheroidizing annealing employed by the present invention.

As described above, the production method of high-carbon chromium bearing steel of the present invention has features of applying spheroidizing annealing to a blank tube after hot tube-making, and subsequent cooling of the blank tube, and basic configurations of the production method of the bearing steel may not be limited to specific ones. Specifically, steel is melted and casted so as to have the chemical composition of a high-carbon chromium bearing steel that is the target of the present invention, and thereafter, is produced into a blank tube by using various hot tube-making processes (such as extrusion tube-making process, push-bench tube-making process, and the Mannesmann tube-making process, etc.), and the spheroidizing annealing defined by the present invention is applied to this blank tube. Descaling, other type(s) of heating treatment, and cold working may be applied before and after the spheroidizing annealing.

In the production method of the present invention, spheroidizing annealing is carried out in a carburizing atmosphere so as to promote carburizing in a decarburized layer generated depending on carbon potential of steel and processes until hot tube-making to thereby achieve recarburization, but at this time, carburizing may excessively take place to cause overcarburization in some cases.

A controlling method of an atmosphere gas used as the carburizing atmosphere is not specifically limited. An example of the controlling method of the atmosphere gas may include a method of using only an endothermic converted gas (RX gas), and a method of using a $CO$—$CO_2$—$H_2$—$H_2O$—$N_2$-based gas made of a mixture of an RX gas and an exothermic converted gas (NX gas).

The case of using only the RX gas for preparing the carburizing atmosphere increases a fuel cost required for generating RX gas in need. Meanwhile, in the case of using the gaseous mixture of the RX gas and the NX gas, the carbon potential becomes smaller than that of the atmosphere prepared by using only the RX gas, but the fuel cost for generating the NX gas is smaller than that for generating the RX gas, which is relatively inexpensive. The carbon potential can be controlled based on the mixture ratio between both the gases.

In the production method of the high-carbon chromium bearing steel of the present invention, the blank tube after hot tube-making is heated and retained in the carburizing atmosphere, and thereafter, is subjected to spheroidizing annealing in which while maintaining the carburizing atmosphere so as to promote carburizing, the blank tube is slowly cooled down to a temperature that satisfies the Formula (1), and subsequently the blank tube is cooled in an oxidizing atmosphere, thereby controlling the depth of the decarburized layer or of the overcarburized layer.

The spheroidizing annealing may be carried out by using any common method. For example, an example of the common method may include (a) a method for retaining the blank tube at immediately below the $A_1$ transformation point for a long time, (b) a method for alternately repetitively heating the blank tube at immediately below and above the $A_1$ transformation point, and (c) a method for heating the blank tube at immediately above the $A_1$ transformation point, and thereafter slowly cooling the tube.

FIG. 1 shows an example of a heat pattern of the spheroidizing annealing employed by the present invention, and is equivalent to the spheroidizing annealing method of the above (c).

As shown in FIG. 1, the workpiece (blank tube after hot tube-making) is heated and retained at a temperature higher than the $A_{c1}$ transformation point in the carburizing atmosphere, and thereafter the spheroidizing annealing is carried out in such a manner that the blank tube is slowly cooled down to a temperature T satisfying the Formula (1) (that is, a temperature within a range of not more than $(Ar_1-20)° C$. to not less than 300° C.) in the carburizing atmosphere. In the illustrated example, the blank tube is heated and retained at 800° C., and is slowly cooled down to a time point t on the time axis corresponding to T at a cooling rate of not more than 70° C./Hr (hours). Subsequently, the blank tube is cooled in an oxidizing atmosphere.

In order to secure sufficient time for carburizing, the spheroidizing annealing holding time is preferably set to 120 minutes or more at a temperature higher than the $A_1$ transformation point, and to 15 minutes or more at not more than the $A_1$ transformation point (that is, a temperature range from the $A_1$ transformation point to the temperature T that satisfies the Formula (1)) in the carburizing atmosphere.

The reason for defining the temperature range for the carburizing atmosphere to be a temperature that satisfies the Formula (1), that is, not more than $(A_{r1}-20)° C$. to not less than 300° C. is as follows.

Specifically, as the decarburized layer generated during the processes until the hot-rolled blank tube is produced is deeper, the temperature range for the carburizing atmosphere should be larger for securing sufficient recarburization, and if the decarburized layer generated during the process until the hot-rolled blank tube is produced is thicker, a larger temperature range for the carburizing atmosphere is required for intensive recarburization, which results in decrease in the temperature range for the oxidizing atmosphere. To the contrary, if the decarburized layer is shallow, it is unnecessary to recarburize the decarburized layer so much, so that the temperature range for the carburizing atmosphere may be smaller In this sense, the temperature used for shifting the atmosphere from the carburizing atmosphere to the oxidizing atmosphere is allowed to have a wide range, and it is allowed to determine the temperature satisfying the Formula (1), that is, the temperature at which the slow cooling in the carburizing atmosphere is completed, and the cooling in the oxidizing atmosphere is started, depending on the carbon potential of steel and the extent of the decarburization generated during the processes until the hot tube-making.

If the oxidizing atmosphere is set to be started at a temperature of more than $(Ac_1-20)° C$., not only recarburization becomes insufficient in the decarburized layer in the carburizing atmosphere, but also decarburization is generated in the subsequent oxidizing atmosphere, which results in that the depth of the decarburized layer may be more than 0.2 mm. As aforementioned, if the decarburized layer becomes deeper, the temperature range for the carburizing atmosphere should be sufficiently larger, and for this purpose, the temperature at which the atmosphere is shifted to the oxidizing atmosphere may be necessary to be ambient temperature, for example.

In FIG. 1, the region surrounded by a broken line shows a range where the temperature T satisfying the Formula (1) depending on the extent of decarburization can be appropriately determined. In other words, the upper limit of this range is ($A_{r1}$ transformation point)–20° C. and the lower limit thereof is 300° C. In a real operation, the temperature for the carburizing atmosphere may be down to ambient temperature, but in light of controlling the depth of the overcarburized layer, and because the cost for the atmosphere gas becomes high, the temperature for the oxidizing atmosphere is defined at 300° C. or more.

One of the features of the production method of the high-carbon chromium bearing steel of the present invention is that the temperature satisfying the Formula (1) can be determined, depending on the carbon potential of the workpiece and the extent of the decarburization generated during the processes until the hot tube-making, that is, the temperature at which the cooling in the oxidizing atmosphere is started can be determined.

In the determination of the temperature T satisfying the Formula (1) in a real operation, the extent of the decarburization generated on the workpiece (hot rolled blank tube) is grasped in association with the C content of the workpiece and the processes until hot tube-making, and at the same time, a correlation between the extent of decarburization and the temperature T satisfying the Formula (1) is empirically obtained in advance through the real operation. The above results are accumulated so as to accurately determine the temperature T satisfying the Formula (1), and to control the depth of the decarburized layer or of the overcarburized layer to be within a range of 0 to 0.2 mm, thereby producing the high-carbon chromium bearing steel excellent in machinability.

It is preferable to set the upper limit of the cooling speed in the oxidizing atmosphere to be 200° C./min so as to secure enough time for reducing overcarburization caused by a reaction between the outer layer of steel and carbon. The lower limit thereof is not specifically limited, but it may be preferable to set at 10° C./Hr in light of the production efficiency. Typically, cooling in the oxidizing atmosphere may be conducted by cooling in air.

The high-carbon chromium bearing steel of the present invention is a bearing steel obtained by applying the production method of the present invention, and comprises C: 0.6 to 1.5%, Cr: 0.5 to 5.0%, Si: not more than 1.0% and Mn: not more than 2.0%, the balance being Fe and impurities, as aforementioned. This high-carbon chromium bearing steel may contain one or more of Mo: not more than 1.0%, W: not more than 1.0%, and V: not more than 1.0% if necessary.

Action and effects of elements included in the high-carbon chromium bearing steel of the present invention, and reasons for limitation of the content of each element will now be described.

C: 0.6 to 1.5%

C is an element effective to enhance strength, hardness, and wear resistance for a bearing, and also to enhance its durability life. In order to achieve these effects, the C content is set to be not less than 0.6%. On the other hand, the excessive C content increases carbon potential of steel, so that the extent of the decarburization generated during the processes until the hot tube-making becomes greater, which makes it difficult to carry out carburizing through the atmosphere control. As the C content is increased, carbide in steel tends to become massive, which generates precipitation of gigantic $M_3C$ (M: Fe, Cr)-based carbide, which deteriorates the rolling contact fatigue characteristics of the bearing. Hence, the C content is set to be not more than 1.5%. The preferable range of the C content is 0.8 to 1.2%. The more preferable range thereof is 0.95 to 1.1%.

Cr: 0.5 to 3.0%

Cr is an element effective to contribute to uniform refining of carbide as well as to promote carburizing In order to achieve these effects, the Cr content is preferably set to be not less than 0.5%. The Cr content of not more than 3% allows Cr carbide to precipitate in small amounts and the carbide mainly comprises cementite, so the carburizing reaction is governed by diffusion of C and the growth of carbide is fast, thereby rapidly carrying out the carburizing. The more preferable Cr content is within a range of 0.9 to 1.6%.

Si: not more than 0.1%

Si is an element necessary for deoxidizing the steel, and if the Si content is more than 1.0%, its effect to suppress carburizing becomes excessive, which hinders sufficient recarburization. Toughness of steel is also deteriorated. Accordingly, the Si content is preferably set to be not more than 1 0%. The more preferable Si content is within a range of not less than 0.15% to not more than 0 7%.

Mn: not more than 2.0%

Mn is effective as a deoxidizer, as similar to Si. Mn has an effect to suppress deterioration of hot workability attributable to S contained as an impurity. On the other hand, the excessive Mn content not only causes embrittlement, but also excessively lowers the $A_{c1}$ transformation point, and lowers the effective temperature for the carburizing, resulting in a longer treatment time. Accordingly, the upper limit of the Mn content is preferably set to be 2.0%. The more preferable upper limit thereof is 1.15%.

The bearing steel of the present invention may positively include one or more of Mo, W, and V if necessary.

Mo, W: not more than 1.0%

Mo and W are both effective elements to enhance hardenability, and also enhance temper softening resistance, and effectively acts to enhance toughness of steel. Their excessive contents rather saturate the effect of enhancing toughness, and thus each content of Mo and W is preferably set to be not more than 1.0% if they are added. The preferable contents thereof are not more than 0.25%. Each lower limit of contents of Mo and W is not specifically limited, but is preferably set to be not less than 0.01% in order to attain the remarkable effect thereof.

V: not more than 1.0%

V combines with C during carburizing to form specialty MC-type carbide, and has an effect to diffusively precipitate with carbides of Fe and Cr so as to enhance the durability life against the rolling contact fatigue. The V content of more than 1 0% saturates the effect to enhance the durability life of the rolling contact fatigue, and thus the V content is preferably set to be not more than 1.0% if V is added.

As aforementioned, the production method of the high-carbon chromium bearing steel of the present invention is a method of promoting the recarburizing or the overcarburizing in the carburizing atmosphere during applying the spheroidizing annealing to the blank tube after the hot tube-making, and thereafter shifting the atmosphere to the oxidizing atmosphere, thereby controlling the depth of the decarburized layer or the depth of the overcarburized layer, and eliminating increase in man-hour and cost that partly occurs in the prior art. The high-carbon chromium bearing steel of the present invention is a bearing steel produced by this method of the present invention, which has less machining allowance, suppresses deterioration of machining efficiency, and is excellent in machinability.

EXAMPLES

Steel tubes (85.0φ×7.7t(mm)) obtained through the hot tube-making, and made of steel grade equivalent to SUJ2 specified by JIS G 4805 were heated at a temperature higher than the $A_{r1}$ transformation point, and thereafter, was subjected to the spheroidizing annealing to be slowly cooled down to 660° C. at 70° C./Hr in the carburizing atmosphere for 180 minutes. In a temperature range of less than 660° C., the steel tubes were cooled down at a cooling rate of 70° C./min in the oxidizing atmosphere. Specifically, the steel tubes were cooled down in air in the temperature range of less than 660° C.

The chemical composition of the above steel tubes is shown in Table 1.

TABLE 1

| | Chemical composition (mass %, balance being Fe and impurities) | | | | | | |
|---|---|---|---|---|---|---|---|
| | C | Cr | Si | Mn | P | S | Mo |
| Workpiece | 1.01 | 1.47 | 0.22 | 0.34 | 0.012 | 0.007 | 0.01 |

A gaseous mixture of an RX gas and an NX gas (CO: 12 vol %, $CO_2$: 0.6 vol %, $O_2$: 0.2 vol %, $H_2O$: 0.7%, $H_2$: 21 vol %, the balance being: $N_2$) was used as the carburizing atmosphere gas, and the gas containing $CO_2$: 0.03% and $O_2$: 21%, the balance being $N_2$ was used as the oxidizing atmosphere gas. In other word, no special gas was prepared for the oxidizing atmosphere gas, but air was used as the oxidizing atmosphere.

Carbon concentration in the vicinity of an outer surface of each steel tube (workpiece) after spheroidizing annealing and cooling was measured through an EPMA linear analysis.

Figure 2:
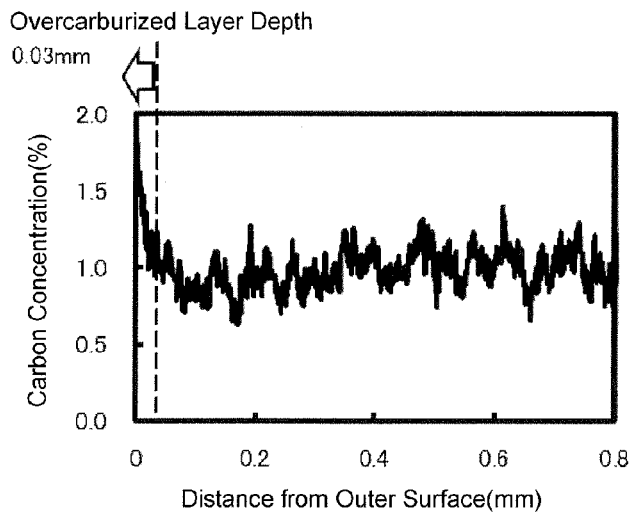
FIG. 2 is a drawing showing a relation between a distance from an outer surface of a workpiece and carbon concentration in a result of an EPMA linear analysis on the carbon concentration of the workpiece.

FIG. 2 is a drawing of the result of the EPMA linear analysis on the carbon concentration of the workpiece, and showing a relation between a distance from the outer surface of the workpiece and the carbon concentration thereof. In this case, the depth of the overcarburized layer was determined by using a position where the carbon concentration was consecutively "the carbon concentration of base metal (%)+0.05 (%) or more" and the distance from the outer surface at this position, where the carbon concentration of the workpiece was measured with a pitch of 0.01 mm and collated in such a manner that numeric data of readings at ten consecutive points were averaged to represent the carbon concentration at a pitch of 0.1 mm.

FIG. 2 reveals that the overcarburized layer had a depth of 0.03 mm, which was within a range of 0 to 0.2 mm.

In the case of the overcarburized layer generated after the spheroidizing annealing and the cooling, the carbon concentration in the vicinity of the outer surface of the workpiece was also measured through the EPMA linear analysis, and the depth of the decarburized layer was determined by using a position where the carbon concentration of the workpiece based on the numeric data obtained in the above manner was consecutively "the carbon concentration of base metal (%)–0.05 (%) or less", and the distance from the outer surface at this position, and as a result of this analysis, it was confirmed that the decarburized layer was within a range of 0 to 0.2 mm.

As a result of the above test, it was confirmed that, according to the production method of the high-carbon chromium bearing steel of the present invention, it is possible to produce a high-carbon chromium bearing steel excellent in machinability, having less machining allowance, and easy to be machined by promoting the recarburizing or the overcarburizing in the carburizing atmosphere, and thereafter shifting the atmosphere to the oxidizing atmosphere so as to control the depth of the decarburized layer or of the overcarburized layer.

INDUSTRIAL APPLICABILITY

The high-carbon chromium bearing steel of the present invention is a bearing steel whose depth of the recarburized layer or of the overcarburized layer is within a range from 0 to 0.2 mm, having less machining allowance, and excellent in machinability. This bearing steel can be more efficiently produced by applying the production method of the high-carbon chromium bearing steel of the present invention, in which the spheroidizing annealing is carried out in the carburizing atmosphere, and thereafter, the cooling is carried out in the oxidizing atmosphere. Accordingly, the present invention can be effectively used in pertinent industrial fields.

What is claimed is:

1. A production method of a high-carbon chromium bearing steel comprising:

heating a workpiece at a temperature higher than an $A_{c1}$ transformation point in a carburizing atmosphere;

slowly cooling the workpiece at not more than 70° C./Hr down to a temperature T satisfying Formula (1) while maintaining the carburizing atmosphere:

$$A_{r1} - 20 \geq T(° C.) \geq 300° C. \qquad (1),$$

where $A_{c1}$: an $A_1$ transformation point at the time of heating the workpiece from a lower temperature, and $A_{r1}$: an $A_1$ transformation point at the time of cooling the workpiece from a higher temperature; and cooling the workpiece in an oxidizing atmosphere.

* * * * *